(12) United States Patent
Imedio Ocaña

(10) Patent No.: US 7,966,854 B2
(45) Date of Patent: Jun. 28, 2011

(54) CLUTCH MECHANISM APPLICABLE TO ELECTROMECHANICAL CYLINDERS FOR LOCKS

(75) Inventor: Juan Imedio Ocaña, Oiartzun (ES)

(73) Assignee: Salto Systems, S.L., Oiartzun (Guipuzcoa) (ES)

( * ) Notice: Subject to any disclaimer, the term of this patent is extended or adjusted under 35 U.S.C. 154(b) by 0 days.

(21) Appl. No.: 12/502,345

(22) Filed: Jul. 14, 2009

(65) Prior Publication Data

US 2010/0012454 A1    Jan. 21, 2010

(30) Foreign Application Priority Data

Jul. 15, 2008    (ES) .................................. 200802105

(51) Int. Cl.
*E05B 47/06* (2006.01)
(52) U.S. Cl. ................ 70/472; 70/149; 70/189; 70/218; 70/223; 70/277; 70/278.7; 70/379 R; 192/69.62; 192/84.6; 192/84.92
(58) Field of Classification Search .................. 70/283, 70/283.1, 278.3, DIG. 42, 472, 149, 218, 70/188, 189, 222, 223, 277, 279.1, DIG. 62, 70/422, 379 R, 379 A, 380, 280; 292/DIG. 27; 192/69.62, 84.6, 84.92
See application file for complete search history.

(56) References Cited

U.S. PATENT DOCUMENTS

| 1,361,756 | A | * | 12/1920 | Egbert | 70/226 |
|---|---|---|---|---|---|
| 4,053,939 | A | | 10/1977 | Nakauchi et al. | |
| 4,177,657 | A | * | 12/1979 | Aydin | 70/278.2 |
| 5,018,375 | A | * | 5/1991 | Tully | 70/472 |
| 5,033,282 | A | * | 7/1991 | Gartner et al. | 70/278.7 |
| 5,628,216 | A | * | 5/1997 | Qureshi et al. | 70/278.7 |
| 5,791,177 | A | * | 8/1998 | Bianco | 70/283.1 |
| 6,384,711 | B1 | * | 5/2002 | Cregger et al. | 340/5.65 |
| 6,427,505 | B2 | * | 8/2002 | Imedio Ocana | 70/422 |
| 6,845,642 | B2 | * | 1/2005 | Imedio Ocana | 70/277 |
| 7,698,919 | B2 | * | 4/2010 | Kim | 70/280 |
| 2004/0250578 | A1 | * | 12/2004 | Sakai | 70/277 |
| 2010/0011822 | A1 | * | 1/2010 | Imedio Ocana | 70/278.7 |
| 2010/0122561 | A1 | * | 5/2010 | Lui | 70/277 |

FOREIGN PATENT DOCUMENTS

| EP | 0 325 171 | 7/1989 |
|---|---|---|
| WO | 2005/116373 | 12/2005 |
| WO | 2006/115337 | 11/2006 |

* cited by examiner

*Primary Examiner* — Lloyd A Gall
(74) *Attorney, Agent, or Firm* — Wenderoth, Lind & Ponack, L.L.P.

(57) ABSTRACT

It comprises a carriage (4) displaceable forwards and backwards by means of a spindle (3) actuated by a motor (2), the carriage (4) containing clutch pins (12) so that in the forward displacement the engagement takes place with a clutch disc (22) integral with which is an eccentric, whose rotation will cause the actuation of the lock in which the unit is fitted. In its displacements the carriage (4) is guided in rods (8) provided in the corresponding cover (5) of a rotor (1) in which the motor (2) and carriage (4) assembly is housed. The clutch pins (12) are connected to pushing springs (13) for pushing them towards the emergency position and therefore that of engagement when those pins (12) are facing the holes (23) of the disc (22).

12 Claims, 5 Drawing Sheets

CLUTCH MECHANISM APPLICABLE TO ELECTROMECHANICAL CYLINDERS FOR LOCKS

OBJECT OF THE INVENTION

As stated in the title of this descriptive specification, the present invention relates to a clutch mechanism applicable to electromechanical cylinders for locks, of the kind created on the basis of a cylinder that is fitted in the corresponding lock and incorporates in its interior a rotor containing the appropriate clutch means, on the basis of which it is able to interlock itself with a clutch disc integral with an eccentric which, as it rotates, is what produces the actuation of the lock.

The aim of the invention is to achieve a clutch mechanism of small dimensions and with a minimum friction in the displaceable elements involved, and which consequently require a minimum effort for its actuation.

BACKGROUND OF THE INVENTION

Electromechanical locks are known whose functioning is based on introducing a code into the lock by means of a card or electronic key, which activates a mechanical system that carries out the locking or unlocking of the door in which that lock is fitted.

This installation or system is fitted inside the door knob or door knobs and inside the cylinder of the door, which form part of the lock assembly, giving rise to a considerable limitation of space.

Moreover, in order to be actuated, present clutch systems require electric motors of a considerable size in order to be able to operate the actual clutch mechanism and which are fitted in conventional locks, which of course implies a loss of space, both that occupied by the motor and that occupied by the clutch system. Moreover, the well known and obligatory provision of end of travel detectors means that the space required has to be even greater.

Indeed, the clutch mechanisms applicable to present electromechanical locks take up a considerable amount of space which inevitably leads to an increase in the volume corresponding to the assembly constituted by the clutch mechanism associated with the electric actuation motor.

DESCRIPTION OF THE PREFERRED FORM OF EMBODIMENT

The mechanism of the invention presents certain particular characteristics on the basis of which the friction between the means that are moving or displaceable between themselves are minimum, therefore offering a minimum resistance, due to which it is possible to use motors of small dimensions since low power is required for the actuation.

Moreover, the elements corresponding to the actual clutch mechanism, according to the invention, are located in the same vertical plane, so that their lengths do not have to be summed up and therefore reducing the volume or space occupied by the actual clutch mechanism.

The fact can also be highlighted that, on the basis of the characteristics of the actual mechanism that are going to be explained below, it is possible to eliminate the end of travel detectors which physically also occupy a notable amount of space.

Specifically, the clutch mechanism of the invention is created on the basis of a carriage displaceable by means of a spindle which is axially actuated by an electromagnetic motor, said carriage consisting of two parts, one as the base and the other as the cover, between which is a pair of clutch pins associated with separate springs which are arranged between the cover of the carriage and some housings axially provided in the rear end of the said clutch pins, provision furthermore having been made so that, provided in the inner face of the base of said carriage is a housing in the form of a "U" for positioning of an elastic element, which of course has the shape of a "U" and has unequal arms, wherein the shorter arm and the transverse piece remain immobilized in the housing, while the larger arm is able to freely bend forwards and backwards inside the actual housing for locating the said elastic element, in such a way that the travel forwards or backwards of that larger arm of the elastic element is limited in one direction by the bottom of the actual housing, while in the other direction the travel is limited by the actual cover of the carriage.

Via its longer elastic arm, that elastic element is positioned in one of the valleys of the actuation spindle for the carriage, with the aim that, depending on the direction of rotation of that element in one way or the other, it will cause the forward or backward displacement of the elastic element and with it the carriage in order to cause the clutch pins to become emerged or to establish their withdrawal which, in the open position appear through some lateral openings made in the base of the carriage and pass through holes provided for the purpose in the corresponding cover of the rotor where the clutch mechanism assembly consisting of the motor, the spindle and the said carriage is mounted.

In the rotation movement, it could occur that the clutch pins remain out of alignment with respect to the holes made for the purpose in the corresponding clutch disc integral with which is an actuation cam for the latch or bolt of the lock, in which case, of course, the engagement does not take place even if the pins are forced towards the opening position by the effect of the springs, while when those clutch pins are made to face the aforementioned openings of the clutch disc then the interlocking takes place and the mechanism is able to carry out the opening of the door by means of actuation of the door knob or, which is the same thing, it is able to actuate in one direction or the other the latch or bolt of the lock fitted to the actual door.

Furthermore, and as another of the main and novel characteristics of the inventive mechanism, it can be mentioned that in its displacements the carriage is guided with a minimum friction on two rods emerging from the inner face corresponding to the cover of the rotor for housing the actual clutch mechanism itself, in which these rods pass through holes made in the carriage in such a way that, owing to the fact that the latter is made of plastic and that the rods have their surfaces machined, the displacements in one direction and the other can be made with the minimum of effort and so a motor of low power and consequently of small dimensions can be used. Moreover, said rods also act as anti-rotation elements for the carriage.

Moreover, the clutch pins have a flange in their rear edge which acts as a stop against some respective projections made in the lateral openings of the base of the carriage, establishing a limit to the travel of these clutch pins in order to prevent them from exiting to the outside when pushed by the corresponding springs and, logically, they are located facing the holes of the clutch disc with the eccentric.

In accordance with the characteristics referred to, in addition to the advantages and benefits offered by the clutch mechanism of the invention, it can be said that in the limit positions of advance and retreat of the longer arm of the elastic element owing to the rotation of the spindle in one direction or the other, this means that in the first case the speed of the motor is very high and its consumption is very low, due to the fact that the resistance offered by the friction between the spindle and said elastic arm of the elastic element is virtually nil, and very small when it is in the rear limit position, this being a consequence of the fact that the "U" shaped elastic element constitutes what could be regarded as a spring materialized by a simple wire of small diameter.

Furthermore, it can be said that when the motor is moving the carriage from one position to another or when that carriage is blocked due to the impossibility of moving the corresponding clutch pins thereof, the consumption is high or very high, in such a way that the low consumption only takes place when the carriage has reached its end positions, a circumstance that permits it to be used as an end of travel detector without any need to add additional elements.

Moreover, when the motor is ordered to move to the engaged position, the current consumed is measured and when it reaches a value below a certain threshold one knows that the carriage has reached its travel limit position and the order can be given to stop the motor.

Said form of establishing the ends of travel present notable advantages compared to conventional systems since the latter force the end of travel with the physical means against which the effort of the motor is made and in which is a large consumption of current takes place, while in the solution of the invention the consumption is less and therefore the power of the motor can be lower, as well as the wear on the mechanisms.

It can also be said that compared to conventional systems with end of travel sensors, the invention has the advantage of not needing space for the sensors, since they do not exist. Another advantage of the non-existence of the sensors is that conventional systems need an immediate response to these sensors in order to prevent the mechanism from exceeding its travel limits and a temporary malfunctioning of the electronics can leave the mechanism out of position due to failing to stop the motor in time when it has been detected that it has reached its end of travel.

Compared to these drawbacks, the solution proposed in the present invention is intrinsically secure since a slow response from the control electronics implies just a moderate increase in the energy consumption, with the mechanism remaining in its end travel position.

BRIEF DESCRIPTION OF THE DRAWINGS

In order to complement the description that is going to be made forthwith, and with the aim of facilitating a better understanding of the characteristics of the invention, this specification is accompanied by a set of drawings on the basis of which the innovations and advantages of the clutch mechanism forming the inventive object will be more easily understood.

DESCRIPTION OF THE PREFERRED FORM OF EMBODIMENT

Figure 1:
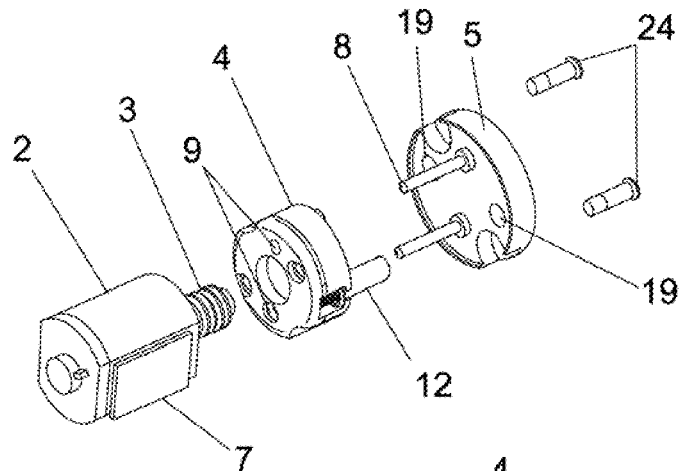
FIG. 1. Shows an exploded perspective view of the actuation motor, the spindle associated with it, and also the displaceable carriage with the clutch pins and the corresponding cover for the rotor in which said motor, clutch and displaceable carriage are housed.

As can be seen in the figures referred to, the clutch mechanism applicable to electromechanical cylinders for locks is created on the basis of a rotor 1 which is a cylindrical body and inside which is fitted an actuation motor 2 with an outlet shaft on which is axially fitted a spindle 3, the latter being provided so that as it rotates it produces a linear displacement of a carriage 4 likewise located inside the rotor 1, the latter being closed at its end by means of a cover 5, in such a way that the said assembly, in other words the rotor with the other elements corresponding to the clutch mechanism, is contained inside the cylinder 6 of the lock.

The motor 2 is preferably electromagnetic and includes a control circuit 7 which, as well as controlling the functioning of that motor, also carries out the functions of detection of end of travel as will be explained further below.

In turns, the displaceable carriage 4 is provided in the interior of the rotor 1 coaxially with the motor 2, with the ability to carry out linear displacement forwards and backwards, being guided in those displacements on a pair of rods 8 emerging from the internal face corresponding to the cover 5 of the rotor 1, and whose rods 8 have a machined surface so that the displacements of the carriage with respect to them can be done with very small efforts from the motor 2, said rods obviously passing through the holes 9 provided for the purpose in the actual carriage 4, preventing the latter from being able to rotate and be moved efficiently by the mechanism constituting the spindle 3 that can be actuated by the motor 2.

Figure 2:
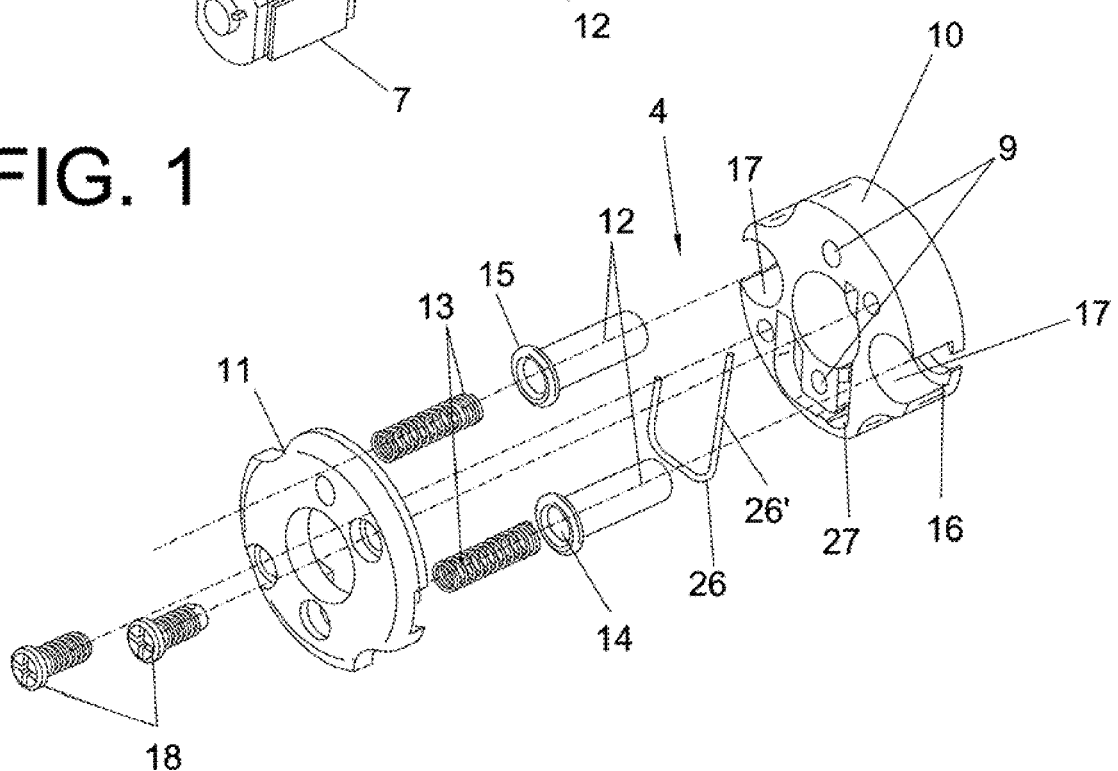
FIG. 2. Shows an exploded perspective view of the elements involved in the displaceable carriage represented in the above figure.
Figure 3:
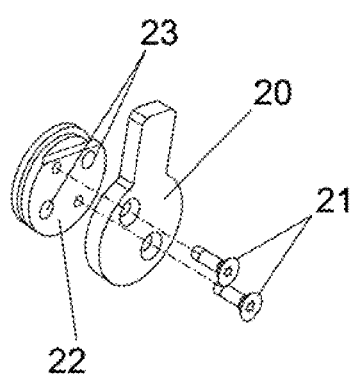
FIG. 3. Shows a detail according to an exploded perspective of the clutch disc and of the eccentric in the position of being fixed together, and on which the clutch pins provided in the carriage represented in the above figures are able to interlock themselves.

In terms of the carriage 4 itself, shown in exploded view in FIG. 2, it comprises a base 10 and a cover 11, and between them a pair of clutch pins 12 associated with respective springs 13 arranged between the cover 11 and a housing 14 established in the respective end of each of the clutch pins 12, this end also including a flange 15 in combination with a projection 16 provided for the purpose in the lateral openings 17 of the actual base 10, which define a means of stopping in order to prevent said clutch pins 12 from being able to exit from the carriage assembly 4.

The fixing between them of the cover 11 to the base 10 of the carriage 4 is done by means of a pair of screws 18 passing through holes made for the purpose in the actual cover 11 and threaded into the holes made in the base 10.

Moreover, the cover 5 of the rotor 1 is provided with a pair of holes 19 which constitute a guide for the clutch pins 12 in the displacement of the latter with the carriage assembly 4, in such a way that when said pins 12 appear through their holes 19 in the cover 5, they can engage with the clutch disc 22 and in this way with the eccentric 20 in charge of carrying out the actuation of the latch and/or bolt of the lock, this eccentric 20 being fixed by means of screws 21 to a clutch disc 22 provided with holes 23 in which the clutch pins 12 themselves interlock.

The cover 5 is fixed to the end of the rotor 1 by means of screws 24.

In addition to the clutch pins 12 and the springs 13, the carriage 4 also incorporates between the cover 11 and the base 10 an elastic element 26, with a U shaped configuration and of minimum thickness, constituting a spring housed in a housing 27 made for the purpose in the inner face of the base 10, as can be seen in FIG. 2, in such a way that both the shorter arm of that U shaped element 26 and the intermediate or transverse arm are immobilized in that housing 27 while the longer arm 26' is able to bend freely forwards and backwards inside the housing 27 until it reaches the bottom thereof or in the opposite direction until it touches the inner face of the actual cover 11.

Said arm or branch 26' of the elastic element 26 interacts with the spindle 3 converting the rotary movement of the motor 2 into a linear movement of the carriage 4, thanks to the fact that the latter cannot rotate due to being guided by the two rods 8, since the arm or branch 26' of the elastic element 26 crosses the spindle 3 virtually perpendicularly at a distance from its axis equal to that of the valleys of said screw 3. All this is done in such a way that when said spindle rotates, the walls of the threads of the latter apply an oblique force to the elastic element 26 which is decomposed into two components, one in the direction perpendicular to the axis of the spindle 3 and which tries to expel the elastic element 26 out of the spindle 3 itself, which is prevented by the housing 27, and the other in the direction parallel to the axis of the spindle 3, which is the permitted one, by means of which the elastic element 26 transmits the force to the carriage 4, causing the linear displacement of the latter.

Therefore, in the forward displacement of the carriage 4, the clutch pins 12 interlock with the clutch disc 22 and therefore with the eccentric 20 fixed to that disc 22, being able to carry out the opening of the door, while when the carriage 4 is displaced backwards the clutch pins 12 remain withdrawn and therefore hidden with respect to the clutch disc 22, with the mechanism becoming disengaged and the door therefore being unable to be opened since the door knob turns freely without being able to carry out that opening or closing of the corresponding lock.

In terms of the elastic element 26 it can be said that the shorter arm and the transverse arm thereof are fixed without freedom of movement between the housing 27 and some protuberances in the actual cover 11 of the carriage 4, these protuberances corresponding to said housing 27 and which merely leave a space equivalent to the diameter or thickness of the actual elastic element or spring 26.

Figure 4:
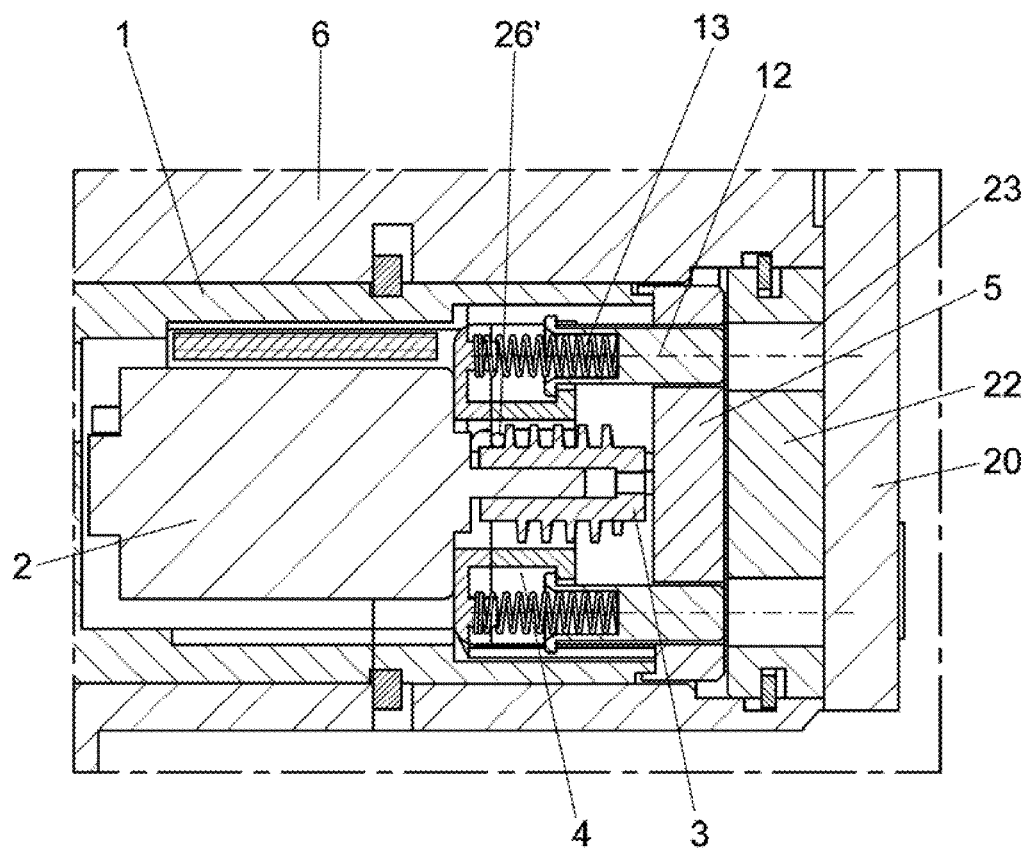
FIGS. 4, 5 and 6. Correspond to different views in cross-section, in the first case showing the rest or disengaged position, while the second case shows the position in which the mechanism has read a valid key and given the order to actuate the motor in order to perform the opening, with the third case representing the position in which the rotation of the corresponding door knob has commenced, integral of course with the rotor, in order to carry out the engagement of the pins with the disc integral with the eccentric and in charge of pulling on the latch and/or bolt of the lock.

On the basis of the said characteristics, it can be seen how FIG. 4 shows the rest or disengaged position, and it can be seen that the carriage 4 is in the position closest to the motor 2 owing to the fact that the arm 26' of the elastic element 26 is to the left of the first turn or thread of the spindle 3. In this position the springs 13 are in their most extended position, pushing the clutch pins 12 against the projections 16 of the cover 10 without any interaction with the disc 22 to which the eccentric 20 is integral, and so the mechanism as a whole is disengaged.

Figure 5:
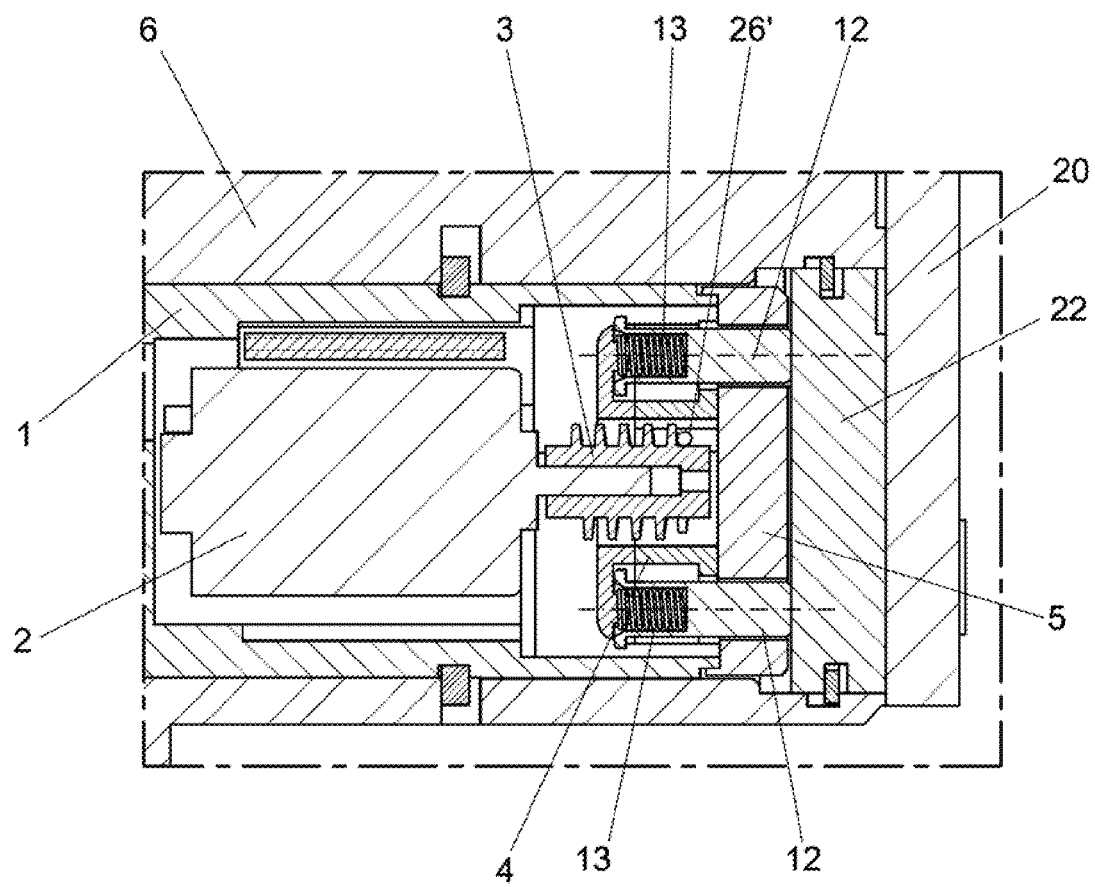

Nevertheless, FIG. 5 shows the mechanism in the position in which the cylinder has read a valid key and given the opening order to the motor 2, in such a way that the angular positions of the rotor 1 and of the clutch disc 22 are such that the guide holes 19 of the clutch pins 12 are out of alignment with the holes 23 of the clutch disc 22. Evidently, this position is achieved by virtue of the fact that when the opening order is given to the motor 2, the rotation of the latter naturally produces the rotation of the spindle 3, having moved the carriage 4 to the furthest position away with respect to the motor 2. In this position of angular misalignment between the holes mentioned above, the clutch pins 12 are made to be unable to advance with the carriage 4, with maximum compression of the springs 13 having taken place.

Figure 6:
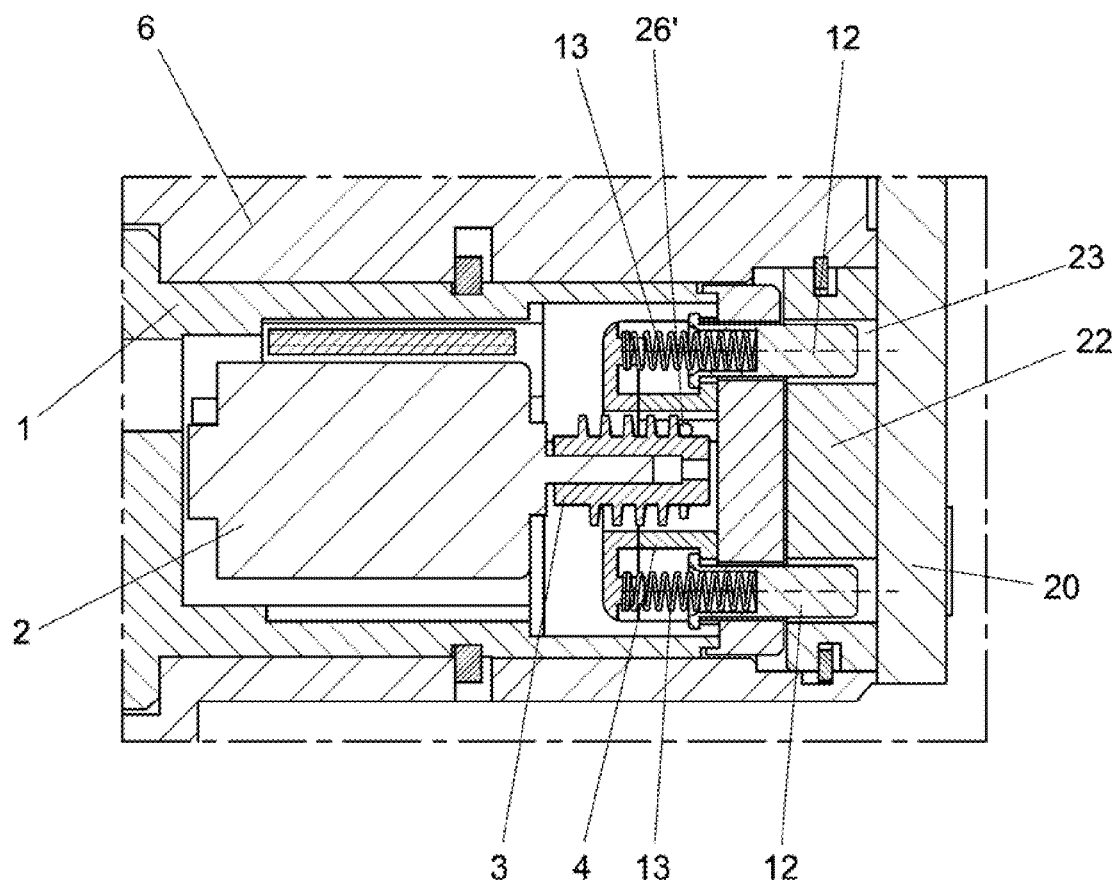

FIG. 6 shows the mechanism in the position in which the door knob has started its rotation by the user, a rotation which of course entails the rotation of the rotor 1 until the guide holes 19 of the clutch pins 12 are facing the holes 23 in the clutch disc, said clutch pins 12 being pushed by the springs 13 for which the said clutch pins 12 penetrate and interlock in the holes 23 of the clutch disc 22 producing the engagement of the cylinder.

After a period of time, the cylinder gives the closure order to the motor 2 so that it can turn the spindle 3 in the opposite direction and move the carriage 4 from the engaged position of FIG. 6 to the disengaged position of FIG. 4. In this movement the carriage 4 drags the clutch pins 12 by mean of retaining projections 16, extracting said pins from the holes 23 of the clutch disc 22.

If the angular positions of the rotor and of the clutch disc 22 are the same, the movement referred to above is performed without any problem. Nevertheless, if the user is applying a turning torque to the door knob against the lock mechanisms, the clutch pins 12 remain between the cover 5 of the rotor 1 and the clutch disc 22, and they cannot be withdrawn, and neither can the carriage 4 be withdrawn, with which the spindle 3 and the motor 2 become blocked. This blocking is detected by the circuit 7 for the motor on account of the increase in current consumption, with disconnection of the actual motor 2 taking place during an operation lasting for fractions of a second, in order to then reattempt the disengaging of the cylinder repeatedly until the cause of the blocking disappears.

Figure 7:
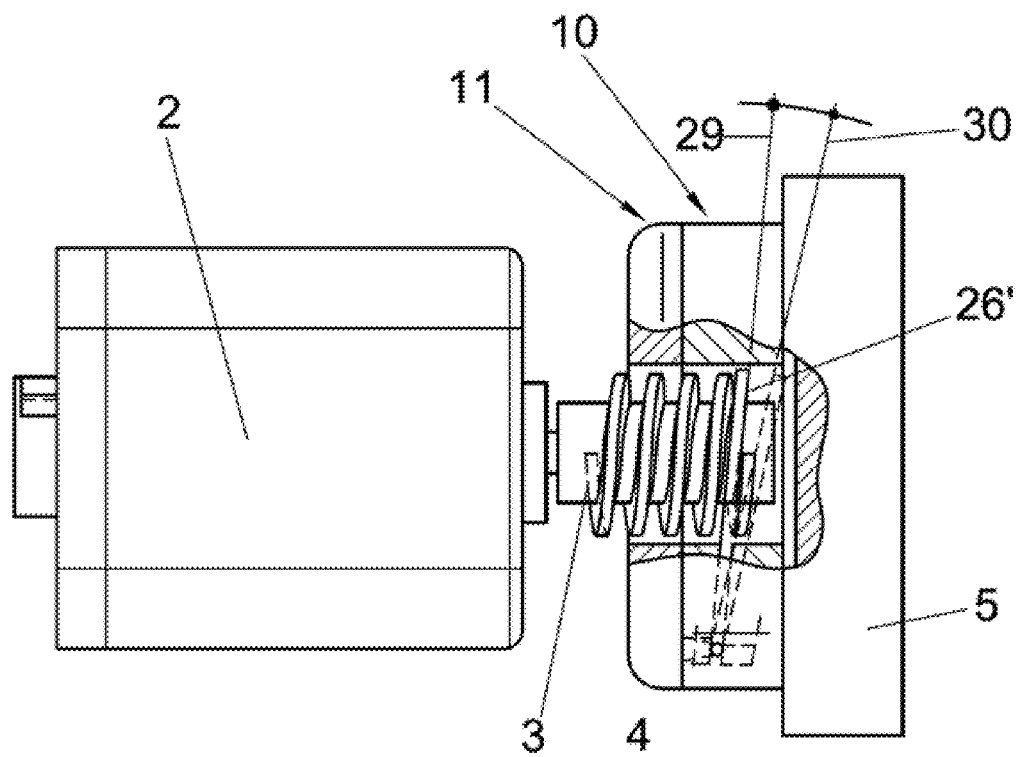
FIGS. 7 and 8. Finally show separate views in elevation with a part in cross-section allowing the carriage to be seen in the end of travel position when it is engaged and with the carriage in the other end of travel position when it is disengaged.

In FIG. 7 the carriage 4 can be seen in the end of travel position when it is engaged, with the motor 2 being able to rotate freely in the opening direction due to the fact that the arm or branch 26' of the elastic element 26 moves alternatively between its rest position shown by the line 29, which coincides with the penultimate turn of the spindle 3, and the limit position on the right represented by the line 30, when it coincides with the last turn of the spindle 3 and in which it has not yet reached the bottom of the housing 27 of the elastic element 26.

Figure 8:
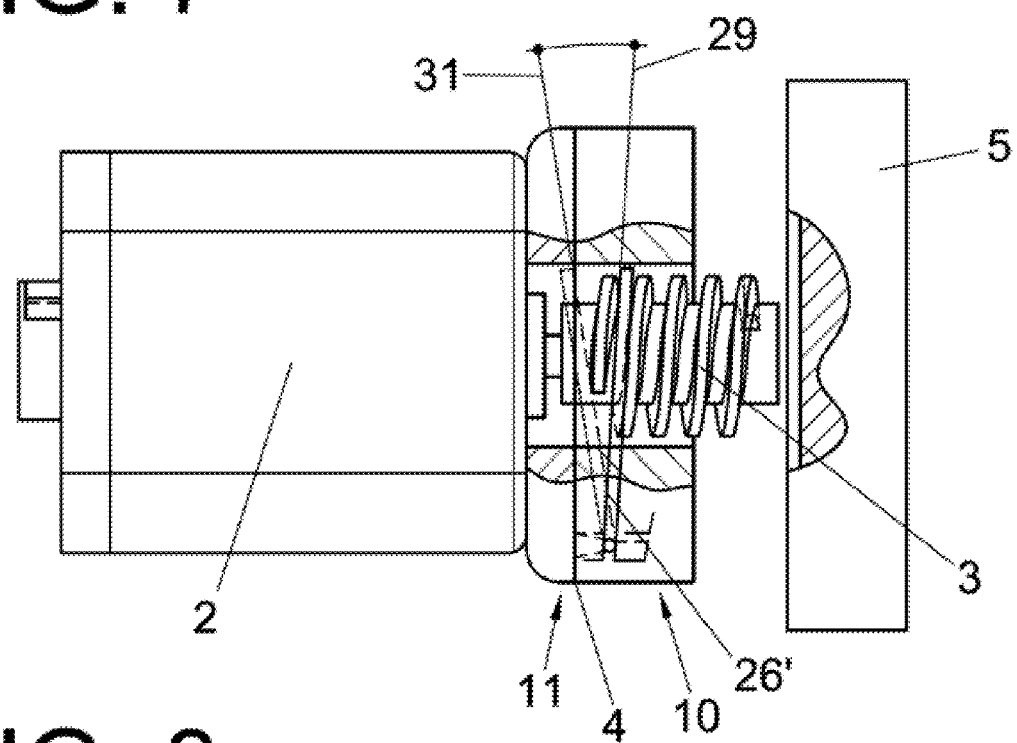

FIG. 8 shows the carriage 4 with the other end of travel when it is disengaged, in such a way that in this case the arm or branch 26' of the elastic element 26 moves alternatively between its rest position 29 and the limit position on the left 31 in which it has not yet collided with the cover 11, therefore the motor 2 can rotate freely in the closing direction.

In both ends, the speed of the motor 2 is high and its consumption is very low, since the resistances offered by the friction between the spindle 3 and the elastic element 26 are virtually nil when the latter is in the rest position 29 and very small in the limit positions 30 and 31, since that elastic element 26 has very little force due to the fact that it is made of a wire of small diameter.

When the motor 2 is moving the carriage 4 from one position to the other, or when the latter is blocked due to the impossibility of moving the clutch pins 12, the consumption is high or very high. The circumstance of the consumption being low only occurs when the carriage 4 has reached its end positions so that it can be used as an end of travel detector without any need to add elements which would, of course, occupy greater space.

The current consumption by the motor 2 can be easily measured by means of the actual control circuit 7, placing a low value resistor in series with the actual motor and measuring the voltage with an analog-digital converter which normally already comes integrated in the micro-controllers.

When the motor 2 is ordered to move to the engaged position, the current consumed is measured, and when this reaches a value below a certain threshold one knows that the carriage 4 has reached its travel limit position and the order can be given to stop the motor 2.

The invention claimed is:

1. A clutch mechanism for an electromechanical cylinder of a lock; the electromechanical cylinder—internally and axially comprising a rotor, said clutch mechanism comprising a clutch configured to be contained in the rotor and to interlock the rotor with a clutch disc on which is fixed an eccentric, the rotation of which produces the actuation of a bolt of the lock, wherein the clutch comprises a carriage axially displaceable by a spindle coupled to an output of an electromagnetic motor; when the carriage comprises a carriage cover, a base and a U shaped elastic element, which comprises unequal side arms and is located in an elastic element housing established in an inner face of the base, so that a longer side arm of the unequal side arms of the U shaped elastic element is positioned in one of valleys of the spindle; wherein the carriage cover is fixed to said base by screws; wherein between said base and said carriage cover, the carriage further comprises two springs axially arranged, said two springs having first ends resting on an inner face of the carriage cover and second ends partially housed in end housings belonging to clutch pins, which are able to occupy a non-operating and withdrawn position with respect to a rotor cover, or an operating and emerging position passing through holes made in the clutch disc to which is fixed the eccentric for actuation of the bolt of the lock; wherein a pair of rods emerge from an inner face of the rotor cover and render the carriage unable to rotate, said rods further constituting a guide to guide the carriage with minimal friction during axial displacement of the carriage.

2. The clutch mechanism of claim 1, wherein the axial displacement of the carriage is carried out by the electromagnetic motor by an action of a rotation of the spindle over the longer side arm of the U shaped elastic element.

3. The clutch mechanism of claim 2, wherein the longer side arm of the U shaped elastic element is arranged to undergo bending travel forwards and backwards inside the elastic element housing, the bending travel being limited in one direction by a bottom of the elastic element housing and in the opposite direction by the carriage cover.

4. The clutch mechanism of claim 1, wherein rear ends of the clutch pins are provided with flanges, respectively, which act as stops against respective projections established in lateral openings provided in the base of the carriage.

5. The clutch mechanism of claim 1, wherein both end limits of bending travel of the longer side arm of the U shaped elastic element and a blocking of the clutch pins with the rotor cover are detected by measuring the energy consumption of the motor.

6. The clutch mechanism of claim 2, wherein rear ends of the clutch pins are provided with flanges, respectively, which act as stops against respective projections established in lateral openings provided in the base of the carriage.

7. The clutch mechanism of claim 3, wherein rear ends of the clutch pins are provided with flanges, respectively, which act as stops against respective projections established in lateral openings provided in the base of the carriage.

8. The clutch mechanism of claim 2, wherein both end limits of bending travel of the longer side arm of the U shaped elastic element and a blocking of the clutch pins with the rotor cover are detected by measuring the energy consumption of the motor.

9. The clutch mechanism of claim 3, wherein both end limits of the bending travel of the longer side arm of the U shaped elastic element and a blocking of the clutch pins with the rotor cover are detected by measuring the energy consumption of the motor.

10. The clutch mechanism of claim 4, wherein both end limits of the bending travel of the longer side arm of the U shaped elastic element and a blocking of the clutch pins with the rotor cover are detected by measuring the energy consumption of the motor.

11. The clutch mechanism of claim 3, wherein the motor is provided with a control circuit that detects end limits of the axial displacement of the carriage by measuring the energy consumption of the motor.

12. The clutch mechanism of claim 4, wherein the motor is provided with a control circuit that detects end limits of the axial displacement of the carriage by measuring the energy consumption of the motor.

* * * * *